June 30, 1925. 1,544,044
A. SMITH
PROCESS OF AND APPARATUS FOR AUTOMATIC ELECTRIC ARC WELDING
Filed March 24, 1919 10 Sheets-Sheet 1

Inventor
Andrew Smith
By Eugene C. Brown
Attorney

Witness

June 30, 1925.  
A. SMITH  
1,544,044  
PROCESS OF AND APPARATUS FOR AUTOMATIC ELECTRIC ARC WELDING  
Filed March 24, 1919 10 Sheets-Sheet 3

Witness  
Inventor  
Andrew Smith  
By Eugene C. Brown  
Attorney

June 30, 1925.                                                     1,544,044
A. SMITH
PROCESS OF AND APPARATUS FOR AUTOMATIC ELECTRIC ARC WELDING
Filed March 24, 1919          10 Sheets-Sheet 5

Inventor
Andrew Smith
By Eugene C. Brown
Attorney

Witness

June 30, 1925.

A. SMITH 1,544,044

PROCESS OF AND APPARATUS FOR AUTOMATIC ELECTRIC ARC WELDING

Filed March 24, 1919    10 Sheets-Sheet 9

Witness

Inventor
Andrew Smith
By Eugene C. Brown
Attorney

June 30, 1925. 1,544,044
A. SMITH
PROCESS OF AND APPARATUS FOR AUTOMATIC ELECTRIC ARC WELDING
Filed March 24, 1919 10 Sheets-Sheet 10

Inventor
Andrew Smith

Patented June 30, 1925.

1,544,044

UNITED STATES PATENT OFFICE.

ANDREW SMITH, OF SAN MATEO, CALIFORNIA.

PROCESS OF AND APPARATUS FOR AUTOMATIC ELECTRIC ARC WELDING.

Application filed March 24, 1919. Serial No. 284,528.

*To all whom it may concern:*

Be it known that I, ANDREW SMITH, a citizen of the United States, residing at San Mateo, in the county of San Mateo and State of California, have invented certain new and useful Improvements in Processes of and Apparatus for Automatic Electric Arc Welding, of which the following is a specification.

This invention relates to a method of electric arc welding and apparatus therefor in which the entire seam, joint or weld is simultaneously brought to welding temperature and the metal then united along the entire length of the joint.

The methods of welding heretofore in vogue may be designated as systems of progressive welding, the welding being effected at one point and then moving progressively along the line of the weld. This is true of oxy-acetylene welding, and of the various systems of electric arc welding now in use. In the coke gas system and the water gas system, short sections a few inches in length of the plates to be welded are heated and then welded but the process is a progressive one.

One of the greatest difficulties encountered in the use of the various systems of welding above mentioned is due to the fact that the unequal temperatures and the mechanical pressures exerted at different times and at different places along the weld cause the metal to be unequally strained at different parts and these internal molecular strains are locked or stored up in the body of the metal in a manner which cannot be eliminated. This result is evident from a consideration of the actions taking place at each point along the welded seam. As each section of metal is heated it expands and the molecules subjected to the welding temperature are brought to a condition approaching the liquid state. After the weld is made the metal shrinks, the shrinkage taking place more rapidly at each side of the joint which results in a drawing action upon the more molten portion at the center of the weld thereby leaving the central part under a strain. Then after the metal has reached a solid state contraction takes place and causes other strains. Furthermore, the section undergoing the welding process with its resultant forces of expansion and contraction, transmits some of these forces to the adjacent welded section.

One of the purposes of my invention is to overcome the defects above referred to in the present methods of welding by subjecting the entire length of the weld to the heat of the electric arc so that all parts of the body of the metal are simultaneously subjected to the same conditions, whereby I avoid the production of any inequal strains. I also prevent the strains and inequal conditions between the central and lateral portions of the welded joint by supplying a proper quantity of heat units to the seam or joint during the transition period in which the shrinkage and contraction of the metal has heretofore caused the development of internal molecular strains.

It has heretofore been proposed to mechanically move the arc along the joint by reciprocating mechanism, or in case of pipes by a rotating device and it has also been proposed to subject the arc to the blowing action of a magnetic field. In my copending application, Serial No. 857,227, now Patent No. 1,298,590, dated March 25, 1919, I have disclosed the method of electric welding in which the metal parts are first brought to a welding temperature by an arc issuing from a fluid cooled non-consuming electrode and then to the action of an arc carrying fused globules of metal; and in said application I have also disclosed the idea of oscillating the arc across the path of the joint. I have found that the mechanical movement of the electrodes along the joint or the shifting of the arc by moving the electrical connection from one electrode to another does not produce the uniformity of heating action which is required to effect a perfect weld. I have, therefore, devised a method of automatically controlling the arc and effecting its travel in a uniform and unbroken passage in recurrent cycles under the directing influence of a travelling magnetic field which traverses the length of an extended electrode.

In describing my process of automatic electric arc welding and various forms of apparatus by which it may be carried out, I shall refer to the accompanying drawings, in which.

The parts to be weld-united must first be brought up to a welding temperature by the heat of the electric arc, and then the application of the welding heat must be continued until the parts are welded. The time required for the preheating period during which the metal is brought up to the welding temperature differs, of course, for different thicknessses of metal but the preheating and welding periods are approximately the same in length. I prefer to apply the same strength of current to the metal of the joint or seam to be welded during the heating as during the welding period, the latter being regulated in accordance with the thickness of the metal. There is no danger, therefore, of burning the metal during or at the end of the preheating stage or period.

In prior methods of welding the application of heat is withdrawn upon the completion of the weld, that is at the end of the welding period and the welded parts are then permitted to cool. I have pointed out above the manner in which internal strains and stresses are produced during the shrinkage and contraction which takes place as the welded parts are cooling. I have also referred to the weakness which is produced in the center of the weld due to the fact that it remains in a molten state longer than the lateral parts. I overcome these defects in prior methods by supplying a low or small volume of current after the welding stage for a certain period, which I designate the annealing stage or period, thereby supplying the heat units which would be suddenly withdrawn by conduction into the adjacent cooler parts of the body of the metal and thus permitting the weld to gradually assume a normal temperature and which I have found prevents the formation of internal stresses and strains and also maintains the integrity of the center of the weld. For instance, a current of 200 amperes may be used during the preheating and welding periods in a certain case and a current of 50 amperes during the annealing period.

Figure 1:
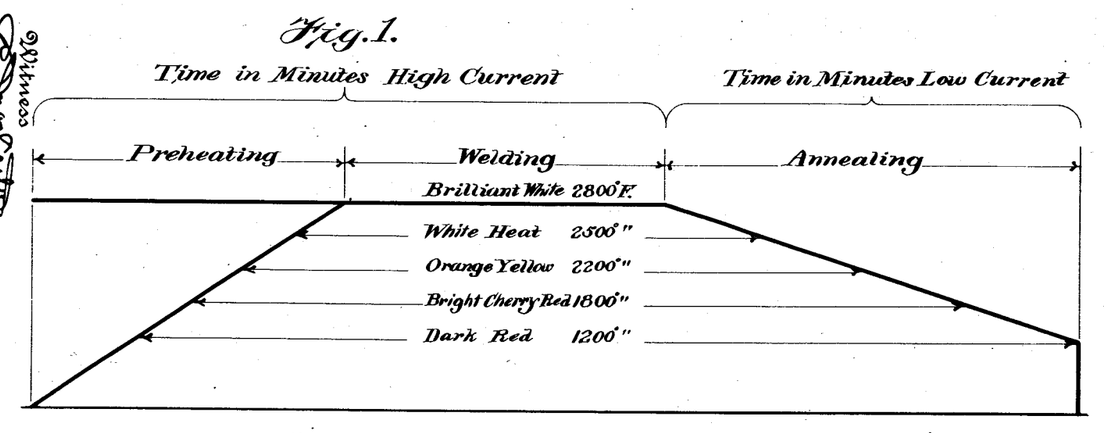
—Figure 1 is an illustrative chart showing the different stages in the application of heat during the welding process.

In Fig. 1 I have indicated diagrammatically the rise in temperature of the metal during the preheating period and then the maintenance of the welding temperature during the welding stage, these two stages being effected under the application of a large amperage at the arc. Then follows the annealing period under the application of a low amperage current until the weld is gradually brought down to a temperature of say a red heat.

Figure 2:
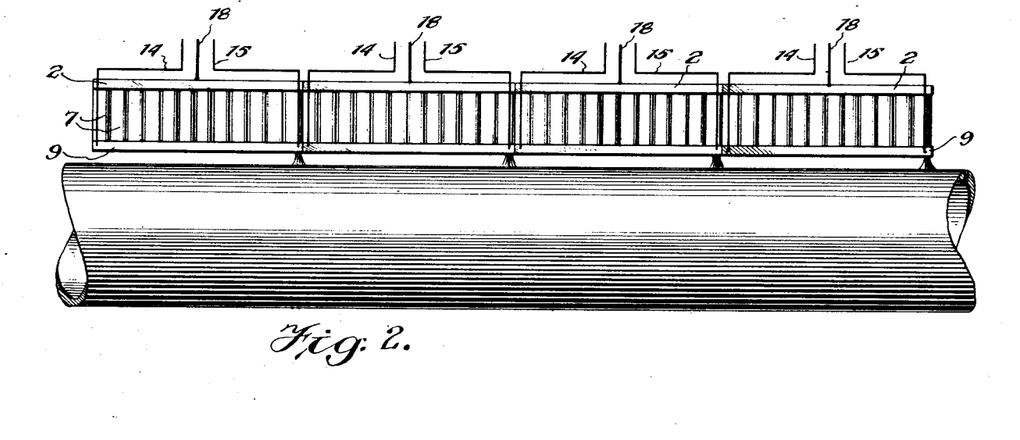
Fig. 2 is a side elevation showing in conventional or diagrammatic form a plurality of arc directing electrodes operating simultaneously upon the longitudinal joint of a pipe.

In Fig. 2 I have illustrated my method of simultaneously heating the entire length of the joint or seam of the pipe to be welded by placing a series of arc directing electrodes thereover and causing an arc from each electrode to vibrate back and forth along the length of its electrode, all of the arcs moving in synchronism, so that the entire length of the joint is heated simultaneously and the weld is made in a unitary operation.

Figures 3, 4:
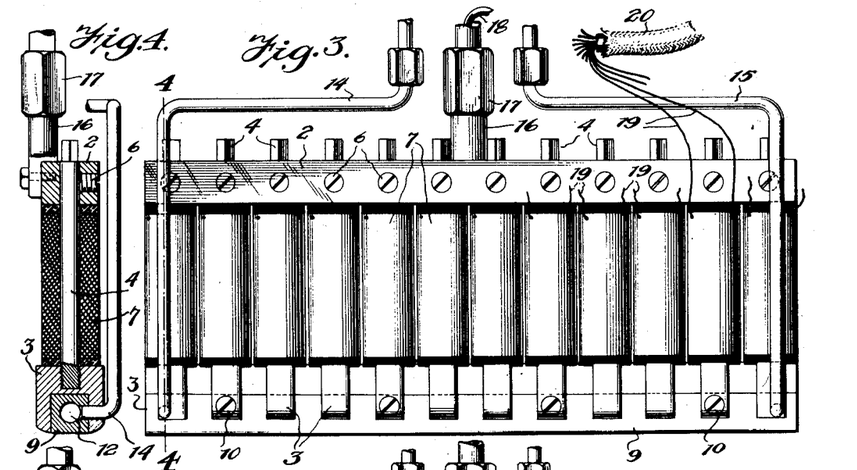
Fig. 3 is a side elevation of one of my arc directing electrodes.
Fig. 4 is a vertical sectional view on the line 4—4 of Fig. 3.

In Fig. 3 I have shown an electrode adapted for welding thick plates of metal, the bar from which the arc springs being water-cooled. The electrode comprises an upper continuous yoke bar 2 and separate lower pole pieces 3 connected by core rods 4 which pass through openings in the upper bar, fitting snugly therein and are screwed into threaded sockets in the lower blocks 3, the upper ends being squared for the application of a wrench. The rods are secured in the upper bar by means of screws 6 which also provide a good electrical connection. Each rod 4 forms the magnetic core for a magnet winding or solenoid coil 7.

The lower blocks or pole pieces 3 of the solenoid magnets are recessed to receive a bar 9, which is preferably made of copper, and which is secured by screws 10. The copper bar is provided with a central longitudinal passage 12 connected at opposite ends to tubes 14 and 15 through which water constantly circulates for the purpose of keeping bar cool to thereby maintain its integrity.

A terminal member 16 is connected to the upper bar 2, either by being formed integral therewith or by being bolted thereto as indicated in Fig. 4, and is provided with a coupling 17, by which it may be connected to the electric cable 18 which carries the welding current. The terminals 19 of the several solenoid coils are connected to the multiple conductor cable 20 which carries a low voltage current to energize the solenoids in proper sequence.

Figures 5, 6:
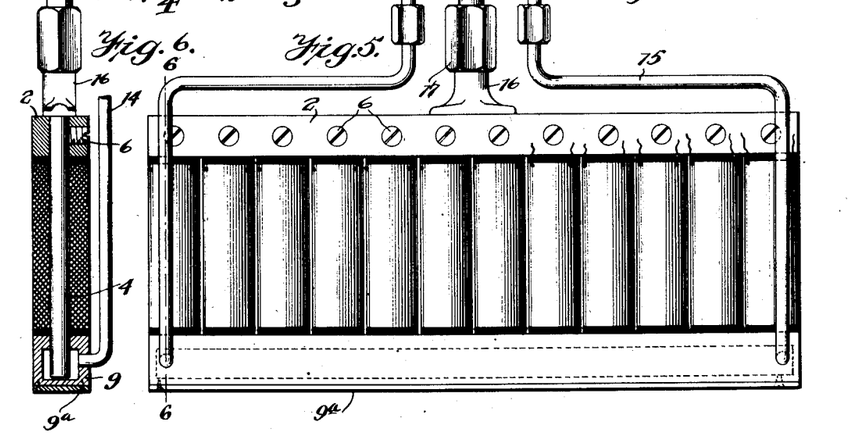
Fig. 5 is a side elevation of another form of my arc directing electrode.
Fig. 6 is a vertical sectional view on the line 6—6 of Fig. 5.
Figure 7:
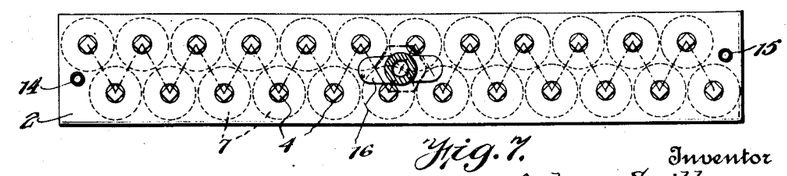
Figs. 7, 8 and 9 are respectively, top plan, side elevation and end elevations of an arc directing electrode for causing the arc to traverse a zigzag path.

I may dispense with the magnetic pole pieces 3 and project the lower ends of the magnet cores 4 into the water passage in the copper arcing bar 9 as in the form shown in Figs. 5 and 6. The ends of the cores 4 are brought close to the bottom of the water passage for the purpose of conducting the magnetic flux closely adjacent to the arcing point. The constant flow of water through the water-passage prevents the pole-piece from becoming heated and thereby decreasing its magnetic properties. The lower ends of the iron cores may be electro-plated to prevent rust where they project into the water passage if desired. They may either fit tightly into the apertures in the arcing bar or be brazed or otherwise secured thereto. I may also provide a removable bottom plate 9ª which may be replaced if it becomes worn or scarred.

It is sometimes desirable to cause the arc to traverse a zigzag path, as when forming a lap-weld, and for this purpose I provide the construction illustrated in Figs. 7 to 10. Two rows of solenoids are arranged in staggered relation with their pole-pieces alternately projecting on one side or the other. The circuits of the solenoids are arranged to cause the energization of the coils in sequence in a zigzag course.

Figures 8, 9, 10, 11, 12:
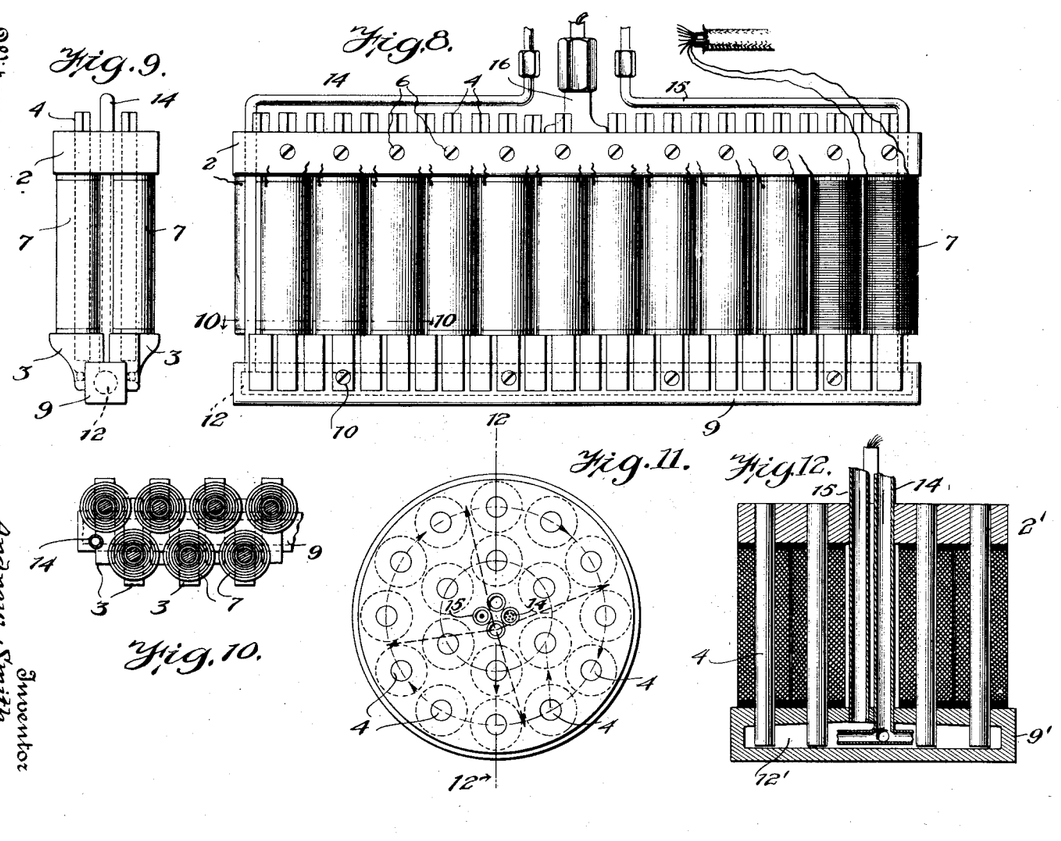
Fig. 10 is a fragmentary sectional view on the line 10—10 of Fig. 8.
Figs. 11 and 12 are respectively top plan and vertical sectional views of an arc directing electrode for causing the arc to traverse concentric circular paths, Fig. 12 being taken on line 12—12 of Fig. 11.

When it is desired to weld an article having a solid extended area, as for instance, to weld the ends of two bars, the upper yoke bar and the copper arcing bar may be circular as indicated at 2' and 9' in Figs. 11 and 12. The circuit connections are arranged to cause the circular series of solenoid coils to be energized in sequence and alternately around the inner and outer series. The inlet water pipe 14 may terminate at its lower end in a double T arrangement the four branches terminating adjacent the outer wall of the circular water passage 12' as indicated by the arrows in Fig. 11, so that the cool incoming water will reach all parts of the copper electrode.

Figures 18, 19:
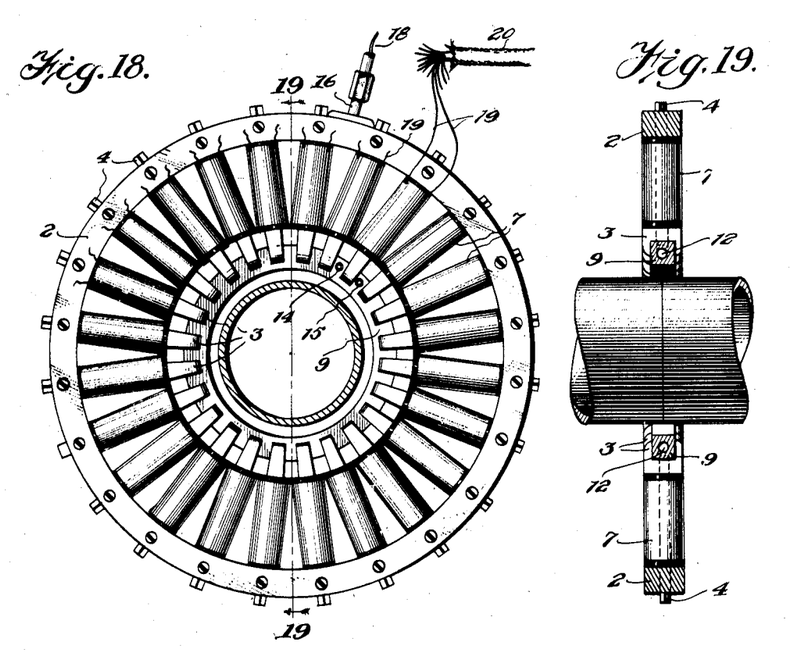
Fig. 18 is a side elevation of an arc directing electrode for directing an arc in a circular path around a pipe or tubular metal structure.
Fig. 19 is a sectional view on the line 19—19 of Fig. 18.

When a butt-weld is to be made between two sections of a pipe the arc directing electrode may be constructed in annular form as indicated in Figs. 18 and 19 which will be readily understood as an adaptation of the previously described constructions.

Figures 13, 14, 15:
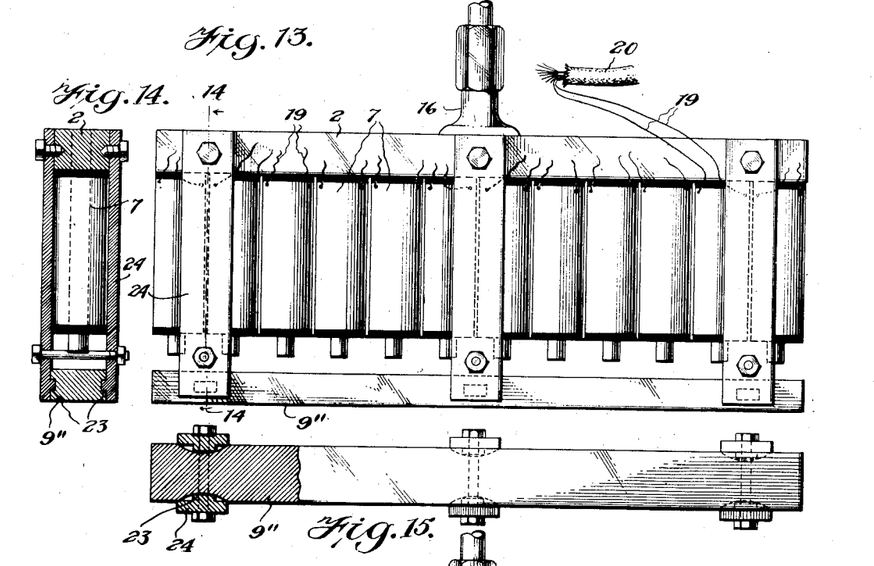
Fig. 13 is a side elevation of an arc directing electrode adapted for light work.
Fig. 14 is a vertical sectional view on the line 14—14 of Fig. 13.
Fig. 15 is a bottom plan view of the same, partly broken away.

When the work to be welded is very light and consequently requiring less heat and a smaller volume of current in the arc, I may dispense with the water cooling. In the construction shown in Figs. 13, 14 and 15, the solid copper arcing bar 9" is provided with lateral recesses which receive lags 23 projecting inwardly from the clamping plates 24, the latter being bolted together adjacent their lower ends and secured by screws at their upper ends to the yoke bar 2. The plates 24 also carry the welding current from the bar 2 to the copper bar 9".

Figure 16:
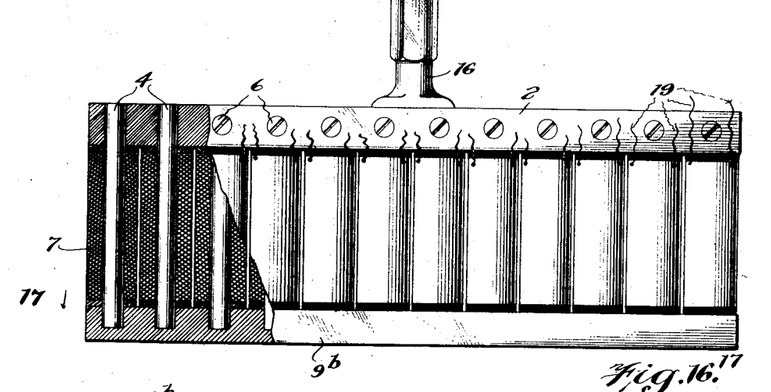
Fig. 16 is a side elevation, broken away in part, of another form of arc directing electrode adapted for light work.
Figure 17:
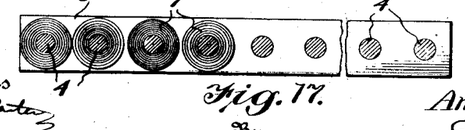
Fig. 17 is a horizontal sectional view on the line 17—17 of Fig. 16.

Another form which may be used when the arcing current is not required to be very large is shown in Figs. 16 and 17. The magnetic cores 7 may be driven into the recesses in the copper bar 9ᵇ with a tight fit and after the magnet coils 7 have been slipped over, the bar 2 is placed over the upper ends and the cores are secured by screws 6.

Figure 20:
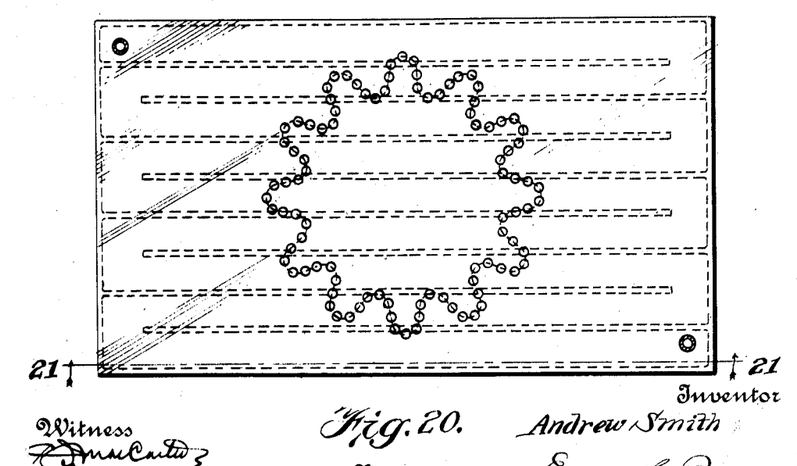
Fig. 20 is a top plan view of a plate form of arc directing electrode for operating upon seams of various designs.
Figures 21, 22:
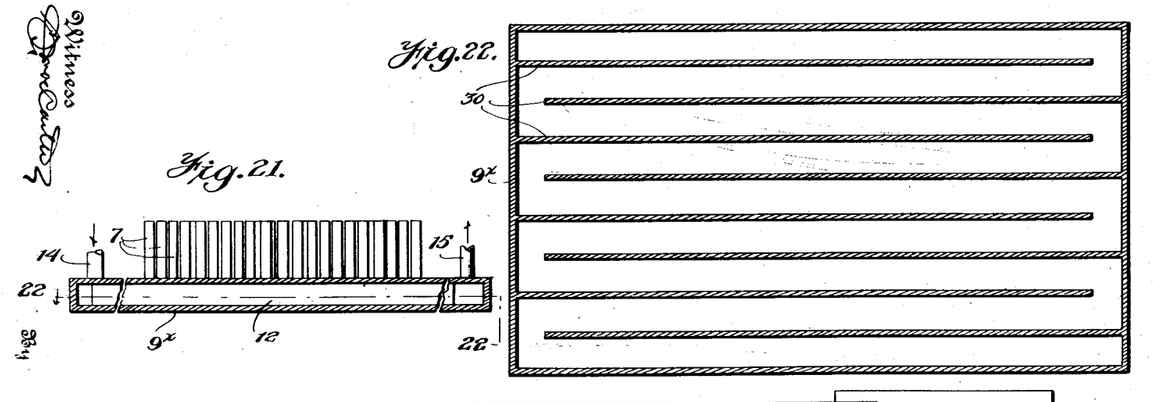
Fig. 21 is a vertical sectional view on the line 21—21 of Fig. 20.
Fig. 22 is a horizontal sectional view on the line 22—22 of Fig. 21.

My method of welding is adapted to weld joints or seams of practically any configuration. In Figs. 20, 21 and 22 I have shown a form of electrode which may be used for welding the seams of any configuration in the same plane. The arcing bar takes the form of an extended hollow block 9ˣ and which is provided with interior baffle plates 30 which cause the cooling water to circulate through any part of the water chamber 12. The solenoid magnets may be arranged on the upper side of the arcing block to conform to the shape or configuration of the joint to be welded and clamped or secured in position in any suitable manner. In Fig. 20 I have shown the solenoids arranged to cover the peripheral outline of a fluted article, such as a metal barrel or transformer casing having its walls formed with deep corrugations. The cover or end plate of the transformer casing or tubular structure is first laid in position on the end of the casing at which the arcing block 9ˣ is placed thereon with the solenoids arranged to follow the configuration of the corrugated edge which is to be welded and the arcing block is then raised slightly to produce the proper arcing distance between the casing and the electrode and can then be welded according to my method without difficulty. The ease with which the various shaped joints may be welded with an electrode apparatus of this construction will be appreciated by engineers.

Figure 31:
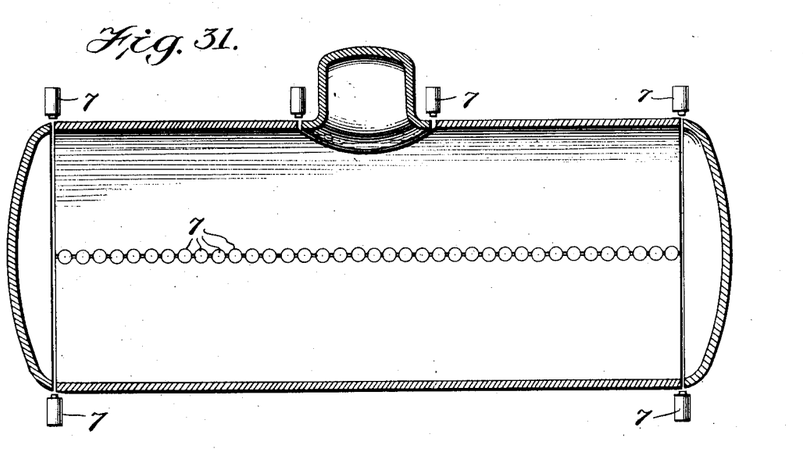
Fig. 31 is a diagrammatic view showing the manner of welding the parts of an oil car tank.
Figures 32, 33:
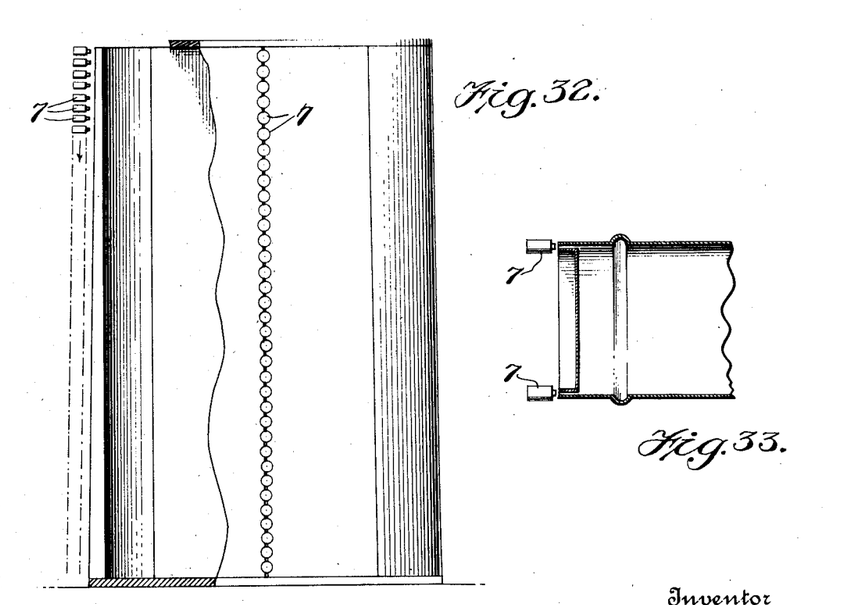
Fig. 32 is a side elevation partly of an oil storage tank and showing my method of welding the joints or seams in situ.
Fig. 33 is a diagrammatic illustration of my method of welding the parts of a metal barrel.

To further illustrate the ready adaptability of my method of welding such structures of widely differing shapes and sizes, I have shown in Figs. 31, 32 and 33 the manner of forming a number of well known containers. In Fig. 31 I have shown the manner of welding the seams of an oil tank such as used in transporting oil on railroads. The longitudinal seam may be welded by using a series of electrode units of the type shown in Figs. 3 and 5, by placing them over the seam in the manner illustrated in Fig. 2. I have merely illustrated diagrammatically a series of solenoid coils along the line of the seam. The ends may be welded to the cylindrical body of the tank by using an annular electrode of the type illustrated in Figs. 18 and 19. Likewise, the dome can be welded by means of an annular electrode with the solenoids arranged in a circular or ring form. I have deemed it sufficient to merely indicate the position of the several electrodes by a diagrammatic illustration of a view of the arc-directing solenoids.

Fig. 33 indicates the manner of welding the end plate of a steel barrel, the position of the electrode being indicated merely by showing two of the arc directing solenoids, the other parts being omitted for the sake of clearness.

My method of welding readily adapts itself for use in the field and consequently large structures can be shaped in parts or sections and then welded in situ at the place where they are to be used, thereby saving an enormous amount of labor and expense in transportation. In Fig. 32 I have illustrated one form of oil tank in which the cylindrical body may be formed of longitudinal plates and the vertical joints or seams may be readily welded by my method. As in the two preceding figures, I have deemed it sufficient to omit the details of the electrodes and to merely indicate their position by a diagrammatic illustration of the arc-directing solenoids which are arranged along the line of the seams. It will be understood by engineers, of course, that the plates which form the bottom of the tank are first welded together and then the side plates are set up and welded to each other and to the bottom plate, after which the top plate is welded to the upper edge of the side wall. The pressure of the oil against the side walls increases from the top downward and the plates which form the side walls are therefore, frequently made thicker for the lower courses. By my method, however, the plates for the side walls may extend longitudinally when my method of welding an entire seam simultaneously is employed and consequently the plates may be rolled the desired thickness at the base and tapering toward the top as I have indicated at the left hand side of the figure.

Figure 23:
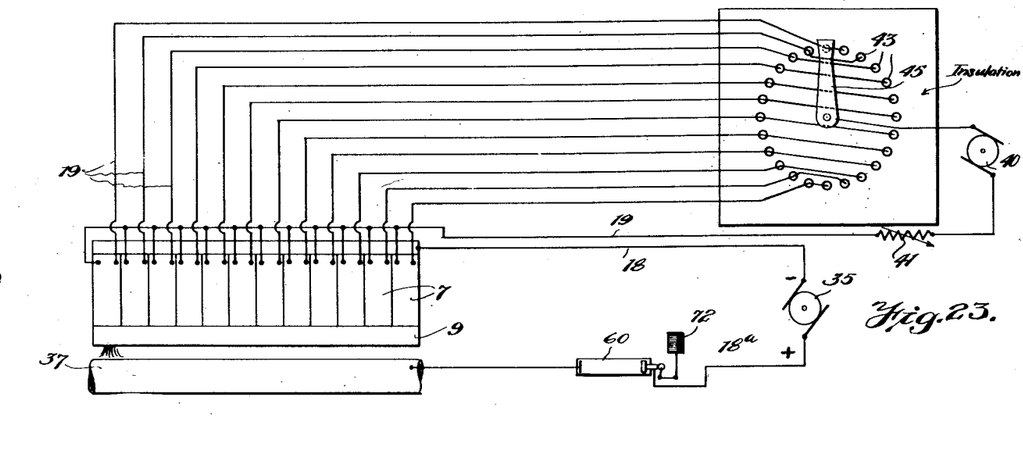
Fig. 23 is a diagrammatic view showing the welding and magnetic control circuits.

The electrical circuits are indicated generally in the diagram shown in Fig. 23 in which 35 is the main generator for supplying current to the welding arc, the lead 18 being connected to the main terminal 16, in the manner illustrated in Figs. 3 to 6 and the other lead 18$^a$ being connected to the work, which is shown as a pipe 37. The arcing current passes from the terminal 16 through the upper yoke bar 2 and the magnet cores 4 and pole pieces 3 to the copper arcing bar 9, from whence the arc is sprung to the joint or seam in the pipe to be welded. It is customary to connect the positive terminal of the generator to the work and the negative terminal to the arcing electrode. The circulation of water through the pipe 14 and the passageway 12 in the arcing bar and return pipe 15 carries off the surplus of heat and maintains the integrity of the copper bar.

The arc is directed against the joint and automatically moved along the line of the weld from one end of the arcing bar 9 to the other and back and forth in rapid succession by means of the magnetic field generated by the solenoids 7. One terminal of each of the solenoid coils is connected to a common lead 19 from the generator 40, an adjustable resistance 41 being interposed for the purpose of controlling the strength of the current and the resulting magnetic fields. The other terminals of the solenoid coils are separately connected to pairs of contacts 43, to the rotary arm 45 of which is connected to the other terminal of the generator 40. While I have shown a separate generator to supply current for the solenoids, it will be understood that this current may be also taken from the generator 35. As the arm 45 is rotated by a suitable motor the solenoids will be energized in succession from one end to the other and back again continuously during the operation of the welding process. By connecting each solenoid to opposite contacts on each side of the center it will be observed that the rotating of the arm 45 effects the cyclic energizing of the solenoids in the manner specified. The magnetic field absolutely controls the position of the arc between the bar 9 and the work and compels the arc to travel along the line of the weld with the movement of the magnetic field. The arm 45 is made wide enough to lap over two contacts for an instant before breaking contact with the following contact so that two solenoids are connected in parallel alternately with the single solenoids in succession with the result that the arc is first under one solenoid and then moves to a position intermediate that solenoid and the succeeding one, then under the succeeding solenoid and so on. This produces a uniform movement of the arc instead of an intermittent movement which ensures the uniform heating of the welded parts.

Figures 24, 25, 26:
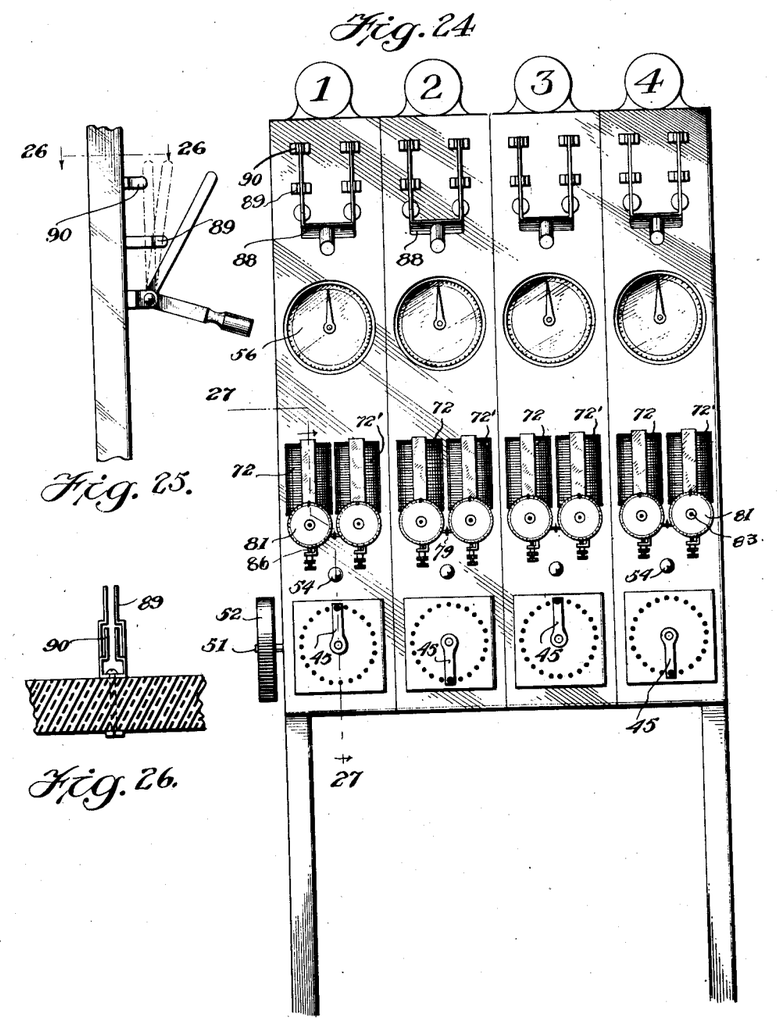
Fig. 24 is a front elevation of a four-panel switch control board.
Fig. 25 is a side elevation of one of the panel switches.
Fig. 26 is a sectional view on the line 26—26 of Fig. 25.
Figures 27, 28:
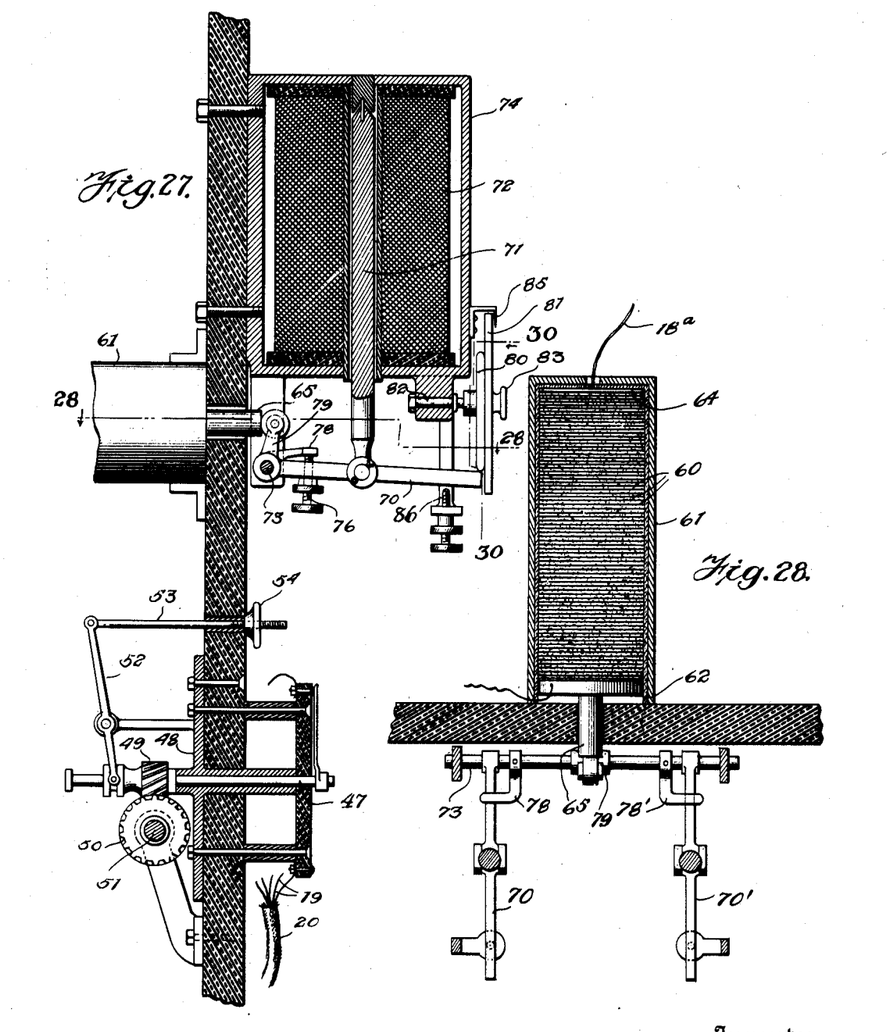
Fig. 27 is an enlarged vertical sectional view on the line 27—27 of Fig. 24.
Fig. 28 is a horizontal sectional view on the line 28—28 of Fig. 27.

The manner of arranging the controlling panels on the switch board is illustrated in Fig. 24. The rotary distributers connected with the solenoids of the several electrodes are arranged at the bottom and their rotary contact arms 45 are mounted on shafts 47 carried in bearing plates 48 secured to the back of the switch board panels as shown in Fig. 27. Each shaft 47 carries a worm gear 49 which is splined thereon and can be placed into or out of engagement in a worm 50 carried by the drive shaft 51, provided with a belt pulley 52 adapted to be driven by any suitable motor. The distributer arm may be thrown into or out of engagement with the power shaft by shifting the worm gear 49 by means of the lever 52 and operating rod 53, the latter projecting through the front of the panel board and being arranged with an actuating handle or thumb piece 54. Each panel board may be provided with an ammeter 56 to indicate the strength of the welding current and also with the usual voltmeters, if desired.

Figure 29:
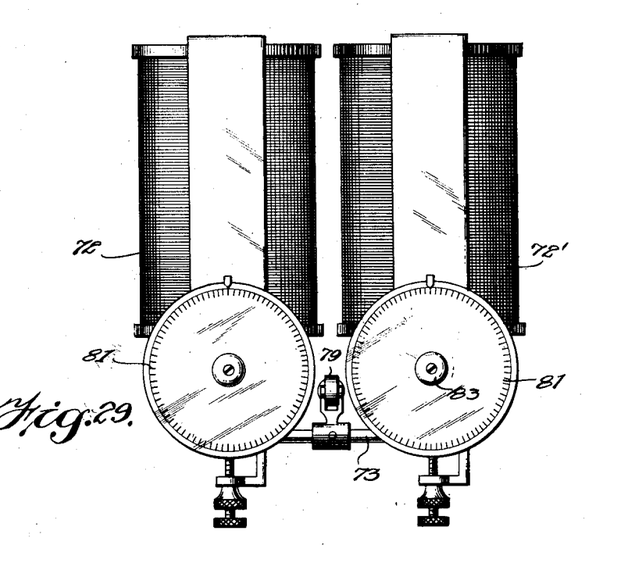
Fig. 29 is an enlarged front elevation of the resistance controlling solenoids.
Figure 30:
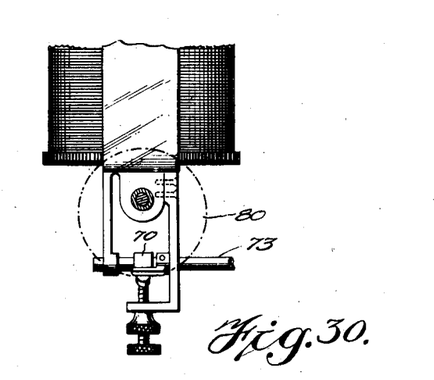
Fig. 30 is an enlarged fragmentary view on the line 30—30 of Fig. 27.

For the purpose of automatically regulating the strength of the arcing current, I provide each welding circuit with a regulating resistance in the form of a carbon pile, the pressure thereon being controlled by a solenoid having means for precisely predetermining its leverage. The resistance consists of a series of carbon plates 60, enclosed in a casing 61 provided with a suitable insulating lining 62, the circuit connections being made at one end through a conducting plate 64 and at the other end through the plunger 65. The lever 70 to which the plunger 71 of the solenoid 72 is pivotally secured, is loosely mounted on the rock-shaft 73 carried in suitable brackets which may depend from the yoke frame 74 of the solenoid. The pull of the core 71 is exerted through an adjustable screw 76 carried by the lever arms 70 bearing against an arm 78 which is pinned to the shaft 73. As the shaft is rotated, pressure is exerted on the plunger 65 by means of a roller arm 79 which is fast on the shaft 73.

For the purpose of varying the length of stroke of the lever 70 and thereby the pressure exerted by the solenoid on the plunger 65, I provide a cam disk 80 secured to a graduated disk 81 and mounted on a spindle 82. The cam can be moved to vary the distance of its perimeter from the spindle 82 by turning the thumb-piece 83, its position being indicated by the scale reading on the disk as it moves under the index pointer 85. The cam acts as a stop against which the outer end of the lever 70 strikes as it is drawn upward by the solenoid. As is well understood, the resistance of the carbon pile decreases with the increase of pressure on the plunger. The exact amount of pressure to produce the resistance required in the circuit to permit a certain current to flow through the welding arc can be predetermined with accuracy and the corresponding reading on the graduated disk 81 which determines the position of the cam stop 80 also noted. A back stop 86 holds the lever when the solenoid is deenergized.

I provide for an instantaneous change in the resistance of the circuit to change from the large amperage welding current to the low amperage annealing current by arranging the rock-shaft 73 so that it may be actuated by separate solenoids, the lever connections of the two solenoids being at opposite ends of the rock-shaft with the roller arm acting on the plunger 65 in the center. I have designated the other solenoid and its parts by the same reference numerals primed.

The switches 88 which control the circuits through the solenoids are shown at the top of the several panels. I have shown each switch as operating singly but it is evident that they may be connected to be operated simultaneously if desired.

The switch is provided with a set of contacts 89 which control the solenoid 72 which produces the greater pressure on the carbon pile resistance and permits the heavy welding current to flow through the welding circuit and with another set of contacts 90 which control the solenoid 72' operating with a less pressure to increase the resistance of the carbon pile and cut the current through the arc down to a low amperage during the annealing period. As indicated in Fig. 25, the switch blades first engage the contacts 89, thereby closing the circuit through the solenoid 72 and this is maintained through the preheating and welding periods. At the end of the welding period the switch is moved until its blades engage the contacts 90 to close the circuit through the solenoids 72'. It will be noted that the contacts 90 are engaged by the blades before they leave the contacts 89 so that the circuit will be maintained through the arc in passing from the welding stage to the annealing stage. This may be accomplished by constructing the spring contacts as shown in Fig. 26.

The method of welding in accordance with my invention will be understood from the foregoing detailed description of the apparatus by which it may be carried out. If a joint or seam is to be welded in a pipe, for instance, a number of arc-controlling electrodes, such as shown in Figs. 3 or 5, are arranged over the line of the weld and sufficient to cover its entire length, the electrodes being close together so that the arcs of adjacent electrodes lap over the same point but electrically separated.

The switches 88 are moved into the first position closing the circuit through the solenoids 72 and establishing the arcs between the arcing bars of the several electrodes and the edges of the joint or seam to be welded. The cyclic movement of the magnetic field as the solenoids 7 are successively energized as the arms 45 of the distributers are rotated control the positions of the arcs and cause them to travel with the moving magnetic fields. The circuit connections are so arranged that the arcs always are the distance apart corresponding to the length of an electrode and occupy corresponding positions as they move synchronously. At the end of the welding period the switch blades are thrown into the second position to close the circuit through contacts 90 and bring the carbon resistances under the control of the solenoids 72', thereby reducing the current to low amperage during the annealing period. While I have shown the switch as manually operated, it is evident that they may be moved from first position to second position automatically at the end of the welding period if it is desired to do so.

At the end of the annealing period which completes the welding process, the switch 88 is opened quickly to deenergize the solenoids, thereby releasing the pressure upon the carbon or graphite pile. The resistance of the pile thereupon increases and the arc dies down and is finally extinguished. The increase in resistance before the breaking of the arc serves not only to cause the arc to decrease gradually but also to prevent a rush of current as the arc breaks, thereby preventing any burning of the metal.

In some cases the joints or seams may be welded by bringing the abutting edges up to a welding temperature until they are in a molten condition so that an interpenetration of the molecules is effected either with or without the use of pressure. In other cases it is necessary to supply a filling metal to be reduced to a molten state by the arc and incorporated with the molten edges of the joint or seam. In my said prior application I have disclosed a means of supplying fused globules of molten metal with the arc. In my present method I prefer to supply the filling metal in a very finely divided state or in a powdered form directly to the joint and subject it to the action of the welding arc simultaneously with the metals of the joint or seam to be welded. In this manner there is no danger of the filling metal being burnt or otherwise changed in character or quality and the strength of the resulting weld is not impaired. The filling metal may be supplied to the joint either manually or automatically as desired and depending upon the conditions attending the work.

In the above description of my invention I have referred mainly to the use of the arc for welding but it is evident that it may be applied to the heating of metals to any desired temperature for various purposes as well as for welding them.

I claim :—

1. The process of welding metal with an electric arc, which comprises controlling the transverse travel of the electric arc automatically through a plurality of solenoids operating successively.

2. The method of electric welding which comprises springing an arc from an electrode to the work or article to be welded and subjecting said arc to the directing influence of a series of magnetic fields generated in succession along the path of the projected weld.

3. The process of welding a metal joint at one time regardless of its length or shape, which comprises subjecting the joint to a number of automatically controlled electric arcs operating simultaneously over different portions thereof.

4. The process of welding metal with long welds which consists in subjecting the metal along the path of the weld to an electric arc directed thereover by the action of a magnetic field moving progressively along a magnetic medium.

5. The process of welding joints and seams of metal structures, which comprises supplying a filling of comminuted metal along the joint or seam and simultaneously bringing the entire length of the joint or seam to a welding temperature through the action of an electric arc moving continuously and rythmically thereover under the directing influence of a magnetic field traversing a stationary electrode.

6. The process of welding joints and seams of metal structures, which comprises bringing the entire length of the joint or seam to a welding temperature through the action of an electric arc moving continuously and rythmically thereover under the directing influence of a magnetic field traversing a stationary electrode.

7. The process of electrically welding metal which comprises subjecting the metal parts to be welded to the action of a constantly moving electric arc conveying a current sufficient to raise the metal to a welding temperature and after the weld is effected, subjecting the welded parts to an arc at a lower temperature until the metal has cooled to a solid fixed condition.

8. The process of electrically welding metal which comprises subjecting the metal parts to be welded to the action of a constantly moving electric arc conveying a current sufficient to raise the metal to a welding temperature and after the weld is effected, continuing the arc with a current of lower amperage until the metal has cooled to a red heat.

9. Apparatus for welding metal with an electric arc, which comprises a pressure controlled resistance in circuit with the electric arc, a plurality of magnetically actuated devices for exerting pressure upon said resistance, a switch for controlling the circuits of said magnetic devices, and mechanical means for varying the pressure effect of said devices.

10. Apparatus for welding metal with an electric arc which comprises means for magnetically directing the arc successively along an extended stationary electrode from which the arc is sprung to the work.

11. Apparatus for welding metal with an electric arc which comprises means for regulating the current flowing through the arc, and a plurality of magnetically actuated devices operating automatically upon said regulating means to cause predetermined current values to flow through the arc.

12. Apparatus as set forth in claim 11, and means for manually varying the effect of said magnetically actuated devices.

13. In apparatus for electric welding, an arc-directing electrode, comprising an arcing bar, a plurality of magnet coils extending along said bar, and means for successively energizing said magnet coils to thereby direct an arc along the bar.

14. In apparatus for electric welding, an arc-directing electrode, comprising an arcing bar, a plurality of electro-magnets extending along said bar, and having their magnetic cores secured thereto, and means for successively energizing said magnets to thereby direct an arc along the bar.

15. Apparatus as set forth in claim 13, and said bar having a passage provided with inlet and outlet openings adapted to be connected to a water supply for the purpose of cooling the bar.

16. Apparatus for welding or heating metal with an electric arc, which comprises a pressure controlled variable resistance medium in circuit with the electric arc, a magnetically actuated device for exerting pressure upon said resistance medium, and a switch device for controlling the circuit of said magnetic device independent of the circuit through the arc, whereby the pressure on the resistance may be removed to increase the resistance prior to breaking the arc.

17. Apparatus for welding metal with an electric arc, which comprises a resistance in circuit with the arc, magnetically actuated means for varying said resistance, and mechanism for controlling the operation of said magnetically actuated means and causing it to vary said resistance in accordance with predetermined values, whereby the current through the arc is definitely changed from one predetermined value to another predetermined value at successive stages in the operation.

18. In apparatus for electric heating and welding, an arc-directing apparatus, comprising an electrode from which the welding arc extends to the work, a magnetizing coil having a pole-piece of magnetic material operating to direct the arc projected from said electrode, and means for fluid-cooling said pole-piece.

19. Apparatus for heating and welding metal with an electric arc which comprises stationary magnetic means for directing the arc progressively along the metal.

20. Apparatus for heating and welding metal with an electric arc which comprises arc-directing electrodes, a plurality of solenoids adjacent said electrodes, and means for successively energizing said solenoids to thereby direct an arc progressively along the metal.

In testimony whereof I affix my signature.

ANDREW SMITH.